United States Patent [19]

Ross

[11] 4,121,850
[45] Oct. 24, 1978

[54] BICYCLE FORK END CONSTRUCTION

[75] Inventor: Sherwood B. Ross, Woodmere, N.Y.

[73] Assignee: Chain Bike Corporation, Rockaway Beach, N.Y.

[21] Appl. No.: 793,781

[22] Filed: May 5, 1977

[51] Int. Cl.² ............................................. B62K 25/00
[52] U.S. Cl. ................................................. 280/279
[58] Field of Search ........................ 280/279, 276, 288

[56] References Cited

U.S. PATENT DOCUMENTS

| 1,024,216 | 4/1912 | McKellar | 280/288 |
| 1,401,032 | 12/1921 | Baker et al. | 280/276 |
| 3,976,307 | 10/1976 | Ogisu | 280/279 |

FOREIGN PATENT DOCUMENTS

| 441,632 | 5/1912 | France | 280/288 |
| 627,137 | 9/1927 | France | 280/288 |

*Primary Examiner*—Joseph F. Peters, Jr.
*Assistant Examiner*—Donn McGiehan
*Attorney, Agent, or Firm*—Lackenbach, Lilling & Siegel

[57] ABSTRACT

A bicycle fork end construction including a downwardly facing receiver on the free end of each fork leg for receiving opposite respective ends of a wheel hub axle, fastener means releasably securing the axle ends in respective receivers, a rearward retainer depending from each receiver rearward of the received axle end for retaining the axle ends in the receivers upon accidental unfastening of the axle during forward riding movement, and lower retainers extending forwardly below the receivers to retain the axle upon unfastening and riding over rough terrain.

9 Claims, 6 Drawing Figures

U.S. Patent    Oct. 24, 1978    4,121,850
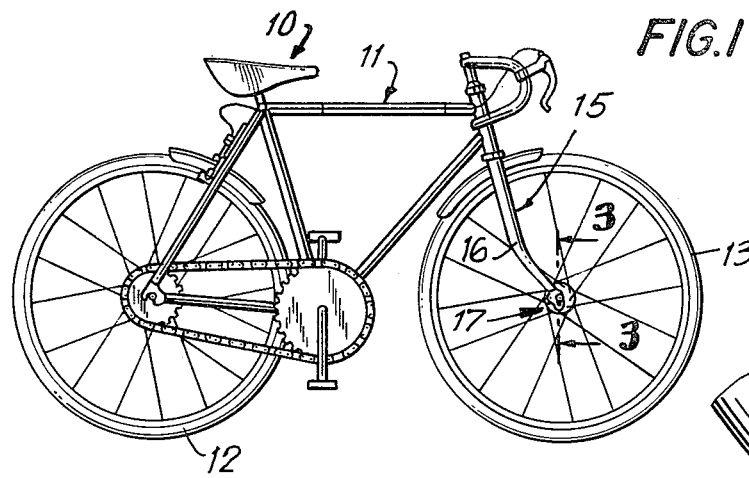
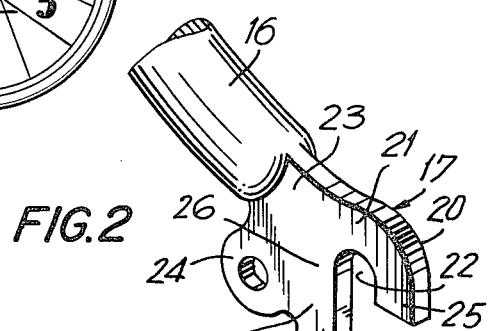
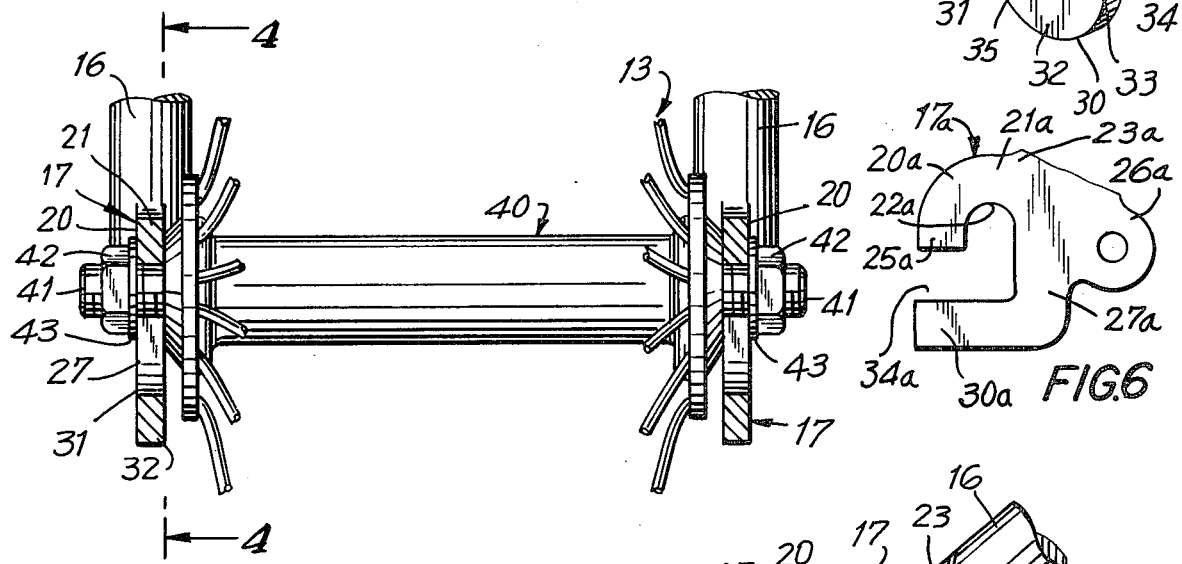
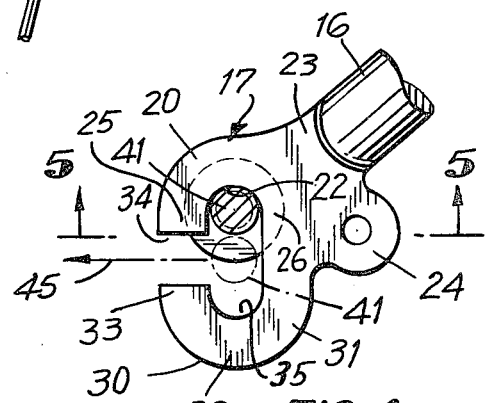
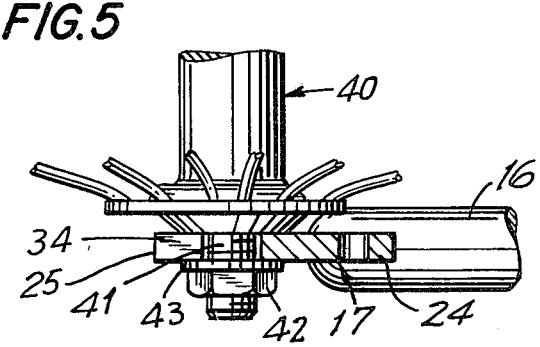

BICYCLE FORK END CONSTRUCTION

BACKGROUND OF THE INVENTION

As is well known to those versed in the bicycle art, it has long been considered necessary and desirable to employ a security washer in connection with conventional means for fastening the front wheel of a bicycle to the fork. The purpose of such security washer was to preclude the possibility of the wheel axle coming out of the open fork end in the event that the fastening nuts should inadvertently become loosened. It has also been quite common and desirable to provide quick release securement means usable without tools and requiring only a simple hand motion to release or open the securement means and permit removal of the front wheel from the fork. It was not practical, however, to use a security washer in combination with quick release securement means since the use of the security washer would frustrate the purpose of the quick release means. That is, upon intended front wheel removal, in the use of conventional nuts with the security washers, it was necessary to excessively loosen the nuts to afford the space required to release the security washers from their lock position. Conventional quick release securement means do not provide the required space for the engagement and disengagement of security washers and, therefore, security washers have not been used in connection with quick release securement means.

SUMMARY OF INVENTION

It is, therefore, an important object of the present invention to provide a highly improved fork end construction for a bicycle which affords enhanced safety in operation by effective retention of the wheel in the fork ends even upon loosening of the axle fastening means.

It is a further object of the present invention to provide a fork end construction for a bicycle having the advantageous characteristics mentioned in the preceding paragraph which is well adapted for use with both quick release and conventional axle securement means and obviates the need for security washers.

It is a further option of the present invention to provide a bicycle fork end construction of the type described which is extremely simple, highly durable and reliable throughout a long useful life, and can be economically manufactured for employment in substantially all types of bicycles at a minimum cost.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described and of which the scope will be indicated by the appended claims.

BRIEF DESCRIPTION OF THE DRAWINGS

FIG. 1 is a side elevational view showing a bicycle having a fork end construction in accordance with the teachings of the present invention.

FIG. 2 is an enlarged partial perspective view showing a fork end constructed in accordance with the teachings of the present invention.

FIG. 3 is a partial sectional elevational view taken generally along the line 3—3 of FIG. 1.

FIG. 4 is a sectional elevational view taken generally along the line 4—4 of FIG. 3.

FIG. 5 is a sectional view taken generally along the line 5—5 of FIG. 4.

FIG. 6 is a partial side elevational view showing a slightly modified embodiment of fork end construction in accordance with the teachings of the present invention.

DESCRIPTION OF THE PREFERRED EMBODIMENT

Referring now more particularly to the drawings, and specifically to FIG. 1 thereof, a bicycle is there generally designated 10, including a frame 11 carrying rear and front wheels 12 and 13. Frame 11 is provided with a forward or front wheel fork generally designated 15 which is astride the front wheel 13 in the conventional manner, the wheel being rotatably mounted in the fork 15 in accordance with the teachings of the present invention.

More specifically, the fork 15 includes a pair of forwardly declining, laterally spaced depending legs 16, which may be substantially identical but of opposite hand, and each provided on its lower end with a wheel mount 17, which mounts may be substantially identical. Thus, it will suffice to describe in detail a single leg 16 and wheel mount 17.

Referring now to FIG. 2, the wheel mount 17 may be integrally fabricated of a single sheet or plate of suitably strong material, such as metal, or the like, or may be fabricated of separate pieces suitably secured together, if desired. Each wheel mount 17 may include a generally downwardly facing receiver 20, which may be essentially of inverted generally U-shaped configuration, having its bight region 21 uppermost and its internal opening 22 facing downwardly. The downwardly facing receiver 20 may be provided with an obliquely upwardly and rearwardly extending connection portion 23 suitably affixed, say by welding, integral formation or otherwise, to the lower end of its associated fork leg 16. Depending from the underside of extension 23, rearwardly of downwardly facing receiver 20, there may be formed a centrally open strut, attachment member or eye 24, disposed generally coplanarly with the downwardly facing receiver 20 and extension or connecting portion 23.

The downwardly facing receiver 20 may be considered as including a pair of forwardly and rearwardly spaced arms 25 and 26 depending from forward and rearward regions of upper bight region 21. The rearward arm 26 may include a portion 27 extending downwardly beyond the forward arm 25 and defining a rearward axle retaining portion, as will appear more fully hereinafter.

The rearward retaining portion 27 may be coplanar with the downwardly facing receiver 20, and an upwardly facing receiver 30 may be defined by a generally upright U-shaped conformation generally coplanar with and spaced below the downwardly facing receiver 20. The upwardly facing, lower receiver 30 may be an extension of the rearward retaining portion 27, including a rear arm 31 depending from the extension 27 to an upwardly concave bight portion 32, and a forward arm 33 upstanding from the forward end of the bight portion 32. The depending forward arm 25 terminates short of and in upwardly, vertically spaced relation with respect to forward lower receiver arm 33 and combines therewith to define therebetween a generally horizontal, forwardly and rearwardly extending passageway 34. The internal opening 35 of the upright U-shaped configuration 30 communicates upwardly with and opens vertically into the downwardly facing opening 22 of upper receiver 20, which openings both communicate forwardly with passageway 34.

The rearward retaining portion 27 and lower, generally U-shaped upwardly facing receiver 30 may advantageously be generally coplanar with the upper receiver 20, extension 23 and eye 24, and formed integrally therewith, but may be otherwise fabricated if desired.

In practice, the lower, upwardly facing receiver 30 may be considered as a lower retaining portion extending forwardly from the rearward retaining portion 27 to retain a received axle against unintended exit upon travel over rough terrain, as will appear more fully hereinafter.

Referring now more particularly to FIGS. 3-5, the wheel 13 is shown therein as including a hub 40 having internally thereof an axle with its ends 41 extending from opposite ends of the hub. The axle ends 41 each extend through a respective wheel mount 17 being shown in solid lines as in the normal operative condition with axle ends received in respective upper, downwardly facing receivers 20. The axle ends are releasably secured therein by suitable securing or fastener means, being shown in the illustrated embodiment as internally threaded fastener elements or nuts 42 threadedly circumposed about the axle ends, and a flat washer 43 interposed between each fastening element or nut 42 and the adjacent wheel mount 17. Of course, other suitable fastening means than the nuts 42 may be employed, the well-known quick release fastener means being advantageous.

As best seen in FIGS. 3 and 4, the operative condition of wheel 13 mounted in fork 15 locates the axle ends 41 in respective upper, downwardly facing receivers 20, extending through respective openings 22. When it is desired to remove the front wheel 13, as on locking and leaving of the bicycle 10, it is only necessary to loosen the fastener means 42 so that the axle ends 41 are free to shift downwardly toward the lower receiver 30 into general alignment with the passageway 34, the phantom position shown in FIG. 4, for exit from the wheel mount in the direction of arrow 45.

In the event of accidental loosening of one or both of the fastener elements 42, the axle ends 41 will remain in their respective receivers 20 upon continued forward riding movement of the bicycle, as will be apparent from the dynamics involved. Even should the bicycle be required to travel over rough terrain causing up and down movement of the bicycle and relative vertical movement of the axle ends 41 in respective mount 17, the rearward retaining portions 27 will upon continued forward bicycle movement prevent rearward removal of the axle ends, and both the lower receiver 30 and upper receiver 20 will effectively receive and retain the axle ends against egress from their mounts 17. Thus, accidental loosening or removal of fastener means 42, or other employed fastener means, will not result in wheel loss and injury to the operator.

A slightly modified embodiment of wheel mount is shown in FIG. 6 and there generally designated 17a, which includes an upper, downwardly facing receiver 20a of generally inverted U-shaped configuration having an upper bight portion 21a, a depending forward arm 25a and a depending rearward arm 26a. A rearward retaining portion 27a depends from the rearward depending arm 26a, as an extension thereof. The mount 17a is similarly provided with a fork end connection or extension 23a.

Extending generally horizontally forwardly from the lower end of rearward retaining portion 27a is a lower retaining portion 30a, which may be of generally straight configuration, terminating at its forward end in spaced relation below the lower end of forward arm 25a to leave an exit space or passageway therebetween, as at 34a. The internal opening within upper, downwardly facing receiver 20a is designated 22a and may, in normal operative conditions, receive an axle end, as in the first described embodiment. In the event of intended front wheel removal, the axle end may pass from opening 22a and exit forwardly through passageway 34a, as in the first described embodiment.

In the event of inadvertent loosening of axle fastener means, the axle ends received in mount 17a will be retained against rearward removal by the rearward retaining portions 27a, and against downward removal by the lower retaining portions 30a. Hence, the embodiment of wheel mount 17a shown in FIG. 6 may, for many purposes, afford suitably safe wheel retention upon inadvertent fastener loosening or release, while certainly affording ease and rapidity of wheel removal when desired, in the same manner as described herein before in connection with the embodiment of FIGS. 1-5.

From the foregoing, it will now be appreciated that the present invention provides a highly improved front wheel fork end construction which is extremely simple in design, rugged and durable in structure for a long useful life, and substantially foolproof and entirely reliable in operation.

Although the present invention has been described in some detail by way of illustration and example for purposes of clarity of understanding, it is understood that certain changes and modifications may be made within the spirit of the invention.

What is claimed is:

1. In a bicycle the combination comprising a front wheel fork having a pair of spaced depending legs; a pair of generally downwardly facing receivers on the lower region of said legs; a wheel hub axle extending between and having its opposite ends received in respective receivers; releasable fastener means on said axle ends for releasably securing the latter in said downwardly facing receivers; a retaining portion depending from each downwardly facing receiver; and a generally upwardly facing receiver depending from each retaining portion in facing spaced relation with an associated downwardly facing receiver to form a passageway for intentional insertion and removal of said wheel hub axle from said receivers, said wheel hub axle normally being positioned and retained by said fastener means within said downwardly facing receivers generally on one side of said passageway, said upwardly facing receivers being arranged to receive said wheel hub axle generally on the other side of said passageway during riding over rough terrain on accidental loosening of said fastener means to thereby prevent said wheel hub axle from unintended exit from said receivers through said passageway.

2. The combination according to claim 1, said downwardly facing receivers facing substantially vertically downwardly.

3. The combination according to claim 1, said upwardly facing receivers facing substantially vertically upwardly.

4. The combination according to claim 1, each associated pair of said upwardly and downwardly facing receivers and said retaining portions combining to provide a generally C-shaped configuration.

5. The combination according to claim 1, said fastener means comprising threaded members.

6. The combination according to claim 1, said fastener means comprising quick release securement means.

7. In a bicycle, the combination comprising a front wheel fork having a pair of spaced depending legs, a pair of downwardly facing receivers on the lower region of said legs, a wheel hub axle extending between and having its opposite ends received in respective receivers, releasable fastener means on said axle ends for releasably securing the latter in said receivers, a rearward retaining portion depending from the rear of each receiver to retain said axle ends against unintended exit from said receivers on accidental loosening of said fastener means during forward riding, and a lower retaining portion extending forwardly from each of said rearward retaining portions below the adjacent receiver; upwardly facing receivers carried by said lower retaining portions in respective facing spaced relation with said downwardly facing receivers for receiving and retaining said axle ends against unintended exit from said receivers on accidental loss of said fastening means during riding over rough terrain, said lower retaining portions being spaced below said receivers sufficiently to provide therebetween a forwardly opening axle exit passageway for intentional exit therethrough of said axle, each associated pair of said upwardly and downwardly facing receivers and said rearward retaining portions combining to provide a generally C-shaped configuration.

8. In a bicycle, the combination comprising a front wheel fork having a pair of spaced depending legs, a pair of downwardly facing receivers on the lower region of said legs, a wheel hub axle extending between and having its opposite ends received in respective receivers, releasable fastener means on said axle ends for releasably securing the latter in said receivers, a rearward retaining portion depending from the rear of each receiver to retain said axle ends against unintended exit from said receivers on accidental loosening of said fastener means during forward riding, and a lower retaining portion extending forwardly from each of said rearward retaining portions below the adjacent receiver; upwardly facing receivers carried by said lower retaining portions in respective facing spaced relation with said downwardly facing receivers for receiving and retaining said axle ends against unintended exit from said receivers on accidental loss of said fastening means during riding over rough terrain, said lower retaining portions being spaced below said receivers sufficiently to provide therebetween a forwardly opening axle exit passageway for intentional exit therethrough of said axle, each associated pair of said upwardly and downwardly facing receivers and said rearward retaining portions being defined by an integral generally C-shaped unit.

9. The combination according to claim 8, said integral units each being generally flat and in laterally spaced parallelism with each other.

* * * * *